US007561976B2

(12) United States Patent  (10) Patent No.: US 7,561,976 B2
Bernard et al.  (45) Date of Patent: Jul. 14, 2009

(54) METHOD AND SYSTEM FOR MONITORING THE PERFORMANCE OF A PIPE CONTAINING A PRESSURISED FLUID

(75) Inventors: Olivier Bernard, Fontainebleau (FR); Bruno Gerard, Montigny sur Loing (FR)

(73) Assignee: Oxand, Avon (FR)

( * ) Notice: Subject to any disclaimer, the term of this patent is extended or adjusted under 35 U.S.C. 154(b) by 243 days.

(21) Appl. No.: 10/548,599

(22) PCT Filed: Mar. 11, 2004

(86) PCT No.: PCT/FR2004/000596

§ 371 (c)(1),
(2), (4) Date: Sep. 12, 2005

(87) PCT Pub. No.: WO2004/083969

PCT Pub. Date: Sep. 30, 2004

(65) Prior Publication Data

US 2006/0217902 A1 Sep. 28, 2006

(30) Foreign Application Priority Data

Mar. 11, 2003 (FR) .................................. 03 02969

(51) Int. Cl.
*G01L 1/00* (2006.01)
*G01F 1/00* (2006.01)
(52) U.S. Cl. ................. 702/42; 33/550; 73/53.03; 376/249; 702/34; 702/47
(58) Field of Classification Search ............. 702/42, 702/43, 47, 113, 183, 34; 324/219; 73/1.01, 73/597, 865.8, 623, 53.03; 33/550; 376/249
See application file for complete search history.

(56) References Cited

U.S. PATENT DOCUMENTS

| 4,935,195 | A | * | 6/1990 | Palusamy et al. ............ 376/249 |
| 6,000,277 | A | | 12/1999 | Smith et al. .................... 73/37 |
| 6,474,165 | B1 | * | 11/2002 | Harper et al. ................. 73/623 |
| 6,556,924 | B1 | * | 4/2003 | Kariyawasam et al. ........ 702/34 |
| 6,996,913 | B2 | * | 2/2006 | Lum et al. ..................... 33/550 |
| 7,181,955 | B2 | * | 2/2007 | Gysling ..................... 73/53.03 |
| 2005/0107963 | A1 | * | 5/2005 | Campbell ..................... 702/42 |

FOREIGN PATENT DOCUMENTS

| CN | 1376909 A | 10/2002 |
| DE | 3531975 A1 | 3/1987 |
| EP | 0 358 994 A1 | 3/1990 |
| JP | 9145530 | 6/1997 |

OTHER PUBLICATIONS

Specification and drawings of U.S Appl. No. 60/402,491, filed on Aug. 8, 2002.*

* cited by examiner

*Primary Examiner*—John H Le
(74) *Attorney, Agent, or Firm*—Young & Thompson

(57) ABSTRACT

A method and system for monitoring the performance of a pipe containing a pressurised fluid. The pipe is made up of at least one current zone and singular zones. A predetermined number of singular zones are monitored, in order to obtain circumferential expansion information; and the calculation of the effective stiffness of the pipe and of the measured residual steel section of the pipe, using this circumferential expansion information. The pipe is dynamically monitored, in order to obtain information relating to the natural vibration frequencies and modes thereof. The information thus gained indicates whether a maintenance operation need be performed on the pipe.

16 Claims, 5 Drawing Sheets

METHOD AND SYSTEM FOR MONITORING THE PERFORMANCE OF A PIPE CONTAINING A PRESSURISED FLUID

The present invention relates to a method for monitoring the performance of a pipe containing a pressurized fluid. It also proposes a system using this method.

This invention falls into the general category of management of the ageing of pipes, in particular made of reinforced or prestressed concrete which contain a pressurized fluid and whose external surface is accessible (either in a tunnel or by clearance).

These reinforced or prestressed concrete pipes are equipped with steel rods which can be subjected to a phenomenon of corrosion which over time results in a reduction in their cross-section. In the following, reference will be made to the concept, which is well known in this field, of a residual steel cross-section.

A major concern of operators of pressurized fluid conveying systems is to control the risk of bursting of pipes containing these pressurized fluids.

This objective is obtained with a method for monitoring the performance of a pipe containing a pressurized fluid, this pipe comprising at least one continuous run zone and singularity zones.

The method according to the invention comprises:
  a static monitoring of a predetermined number of singularity zones and/or continuous run zones of the pipe in order to provide circumferential expansion information, and
  a calculation of the effective stiffness K(ti) of the pipe and its measured residual steel cross-section As(ti) using said circumferential expansion information.

In a particular complete form of the invention, the monitoring method also comprises a dynamic monitoring of the pipe in order to provide information relating to the vibration eigen modes and frequencies of said pipe. This information relating to eigen modes and frequencies is then also used, with the circumferential expansion information, for the calculation of the effective stiffness and the measured residual steel cross-section.

The method according to the invention can also advantageously comprise:
  a process of predicting the temporal evolution A's(t>ti) of an estimator A's(ti) of the residual steel cross-section, this prediction being made on the basis of a model of the corrosion and the mechanical performance of the pipe,
  a comparison between the measured residual steel cross-section (As(ti) and the estimator A's(ti) of the residual steel cross-section, and
  an updating of the corrosion model, when the difference between said measured residual steel cross-section As(ti) and said estimator of the residual steel cross-section A's(ti) is greater than a predetermined precision.

In an advantageous version of the invention, the prediction process is organized so as to integrate, in the phase of updating the corrosion model, information coming from an external source.

The monitoring method according to the invention can also comprise a comparison of the measured value As(ti) of the residual steel cross-section with a limit criterion for mechanical strength (CL), this comparison being followed by:
  either transmission of information for immediate replacement of a section of said pipe corresponding to the monitored zones, when this measured value As(ti) is less than said limit criterion for mechanical strength (CL),
  or a calculation of the remaining service life D(ti) of said pipe.

The method according to the invention can also comprise a comparison of the measured value As(ti) of the residual steel cross-section with an alarm criterion (CA) associated with the mechanical strength of said pipe, this comparison being followed by:
  either transmission of information for reinforcement and subsequent replacement of a section of said pipe corresponding to the monitored zones, when this measured value As(ti) is less than said alarm criterion (CA),
  or a calculation of operating time before the alarm Da(ti) of said pipe actuates.

According to another aspect of the invention, a system is proposed for monitoring the performance of a pipe containing a pressurized fluid, this pipe comprising at least one continuous run zone and singularity zones, characterized in that it comprises:
  a device for static monitoring of a predetermined number of singularity zones in order to provide circumferential expansion information, and
  means for calculating the effective stiffness K(ti) of the pipe and its measured residual steel cross-section As(ti) using said circumferential expansion information.

In a particular embodiment of the invention, this system also comprises a device for dynamic monitoring of the pipe in order to obtain information relating to the vibration eigen modes and frequencies of this pipe, this information relating to natural modes and frequencies also being used by the means for calculating the effective stiffness and the residual steel cross-section of the pipe.

The system according to the invention can also advantageously comprise:
  means for predicting the temporal evolution A's(t>ti) of an estimator A's(ti) of the residual steel cross-section, this prediction being made on the basis of a model of the corrosion and the mechanical performance of the pipe,
  means for comparing the measured residual steel cross-section As(ti) with the estimator A's(ti) of the residual steel cross-section, and
  means for updating the corrosion model when the difference between said measured residual steel cross-section As(ti) and said estimator of the residual steel cross-section A's(ti) is greater than a predetermined precision.

The static monitoring device can comprise means for measuring longitudinal deformations of a section of the pipe and means for measuring circumferential deformations of said section.

The dynamic monitoring device comprises seismometry means for measuring displacement speeds at a predetermined number of points on the pipe.

The system according to the invention can also comprise means for pre-processing raw data provided by the static monitoring device and by the dynamic monitoring device, these pre-processing means being designed to calculate an average deformation over a given period and average eigen frequencies in the operating phase.

The present invention combines techniques of permanent monitoring of the performance in service of this type of pipe and the predictive modelling of its ageing with the intention of controlling the risk of these pipes bursting and optimizing the periods between their replacement.

The long term performance of the singularity zones (for example, passages over support blocks, bends, reduction cones, etc.) of this type of pipe must be distinguished from the long term performance of the continuous run zone, as illustrated in Table 1. Consequently, the intelligent monitoring system according to the invention must integrate this difference in performance and priority in the monitoring.

|  | Singularity zones | Continuous run zones |
|---|---|---|
| General internal corrosion | + | + |
| External corrosion | + |  |
| Initial faults | ++ | + |
| Priority | +++ | + |
| "Static" monitoring | xx |  |
| "Dynamic" monitoring | x (other vibration modes) | xx (Vibration mode I) |

Thus the method according to the invention, in its complete version, consists of:

the instrumentation, using a "static" monitoring, of a limited number of singularity zones (bearings, bends, etc.) defined previously;

and completing this device by instrumenting a section of pipe comprising continuous run zones and singularity zones using a "dynamic" monitoring.

However it should be noted that the method according to the invention can function very well using a static monitoring only.

A significant contribution provided by the method and the system according to the invention in its complete version is related to the combination of two types of monitoring (static and dynamic), the originality of which is the ability to permanently monitor the mechanical performance of the continuous run zone and that of the singularity zones.

The second contribution provided by the method and the system according to the invention consists in the provision of a solution combining the methods of monitoring (monitoring of the circumferential and longitudinal deformations, monitoring of the eigen modes and frequencies) of a section of a pipe and a pre-processing of the data measured. This solution allows determination in an indirect manner of the residual steel cross-section of the instrumented section.

The third contribution consists of making use of the data produced by the monitoring in a model predicting the kinetics of corrosion of the metal parts of the pipes. This enrichment of the modelling allows a prediction of the service life to be reached which minimizes any uncertainty and which allows the appropriate maintenance operations to be actuated at the appropriate time.

In conclusion, these three contributions allow optimization of the periods between the replacement of the instrumented pipes while controlling the risk of these structures bursting.

The method of monitoring according to the invention allows:

permanent determination in an indirect manner of the residual steel cross-section existing in a reinforced concrete pipe;

comparison of the measured values with estimators produced from validated physical models;

making use of the data produced by the monitoring in a prediction tool for predicting the long term evolution of the residual steel cross-section while minimizing the sources of uncertainty;

comparison of the measured values with criteria for mechanical strength;

definition of a global strategy for management of a network of pipes by only instrumenting a limited number of singularity sections;

undertaking the appropriate maintenance operations for the state of deterioration of the pipes in terms of cost and time;

minimization of the costs associated with the maintenance of the pipes;

control of the risks of the pipes bursting;

assurance for the monitoring authorities and the public by the provision of a permanent and active control using the intelligent monitoring device.

Other advantages and characteristics of the invention will become apparent when examining the detailed description of an embodiment which is in no way limitative, and the attached drawings in which.

Figure 1:
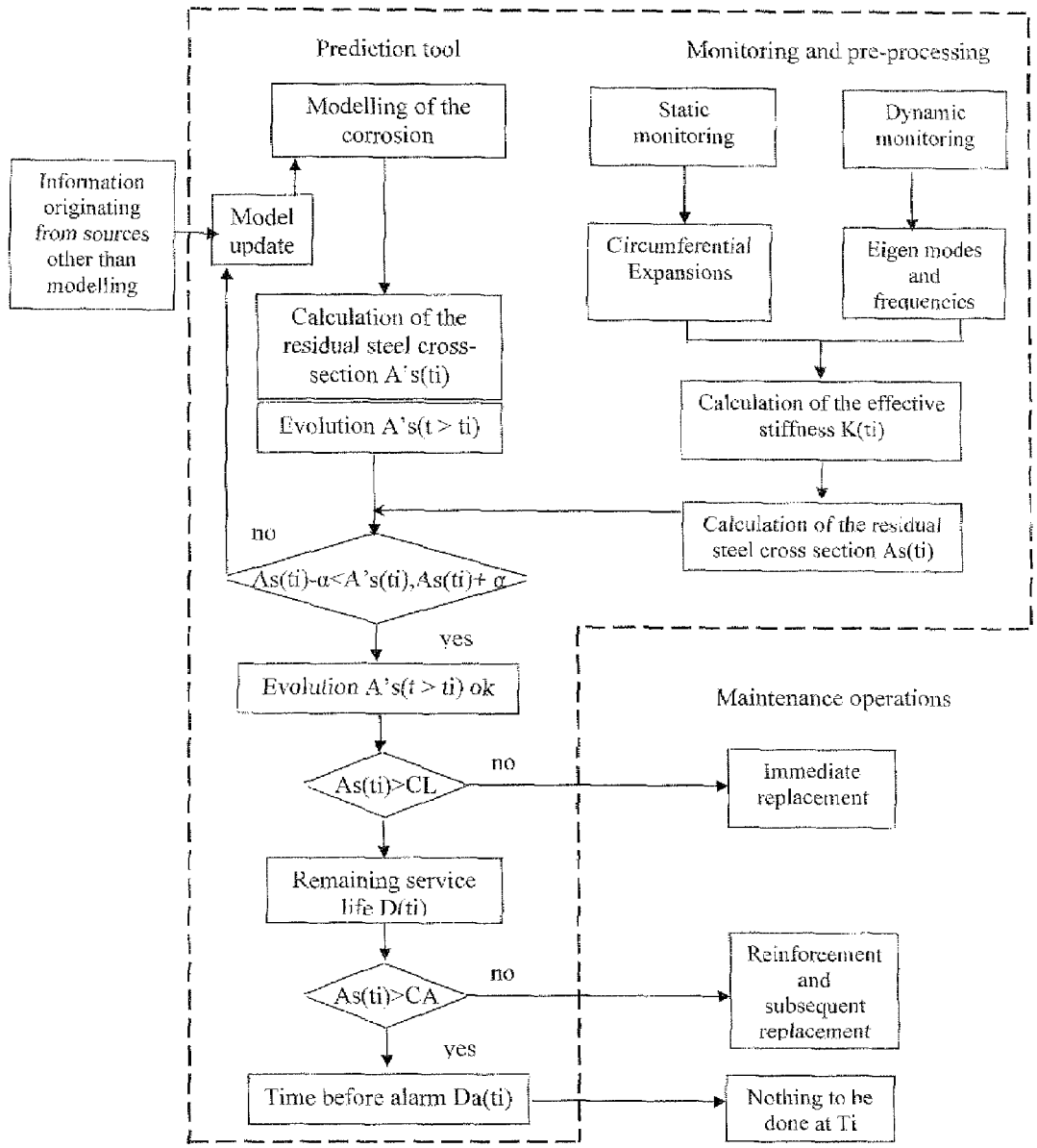
FIG. 1 illustrates the operating principle of the method according to the invention.
Figure 2:
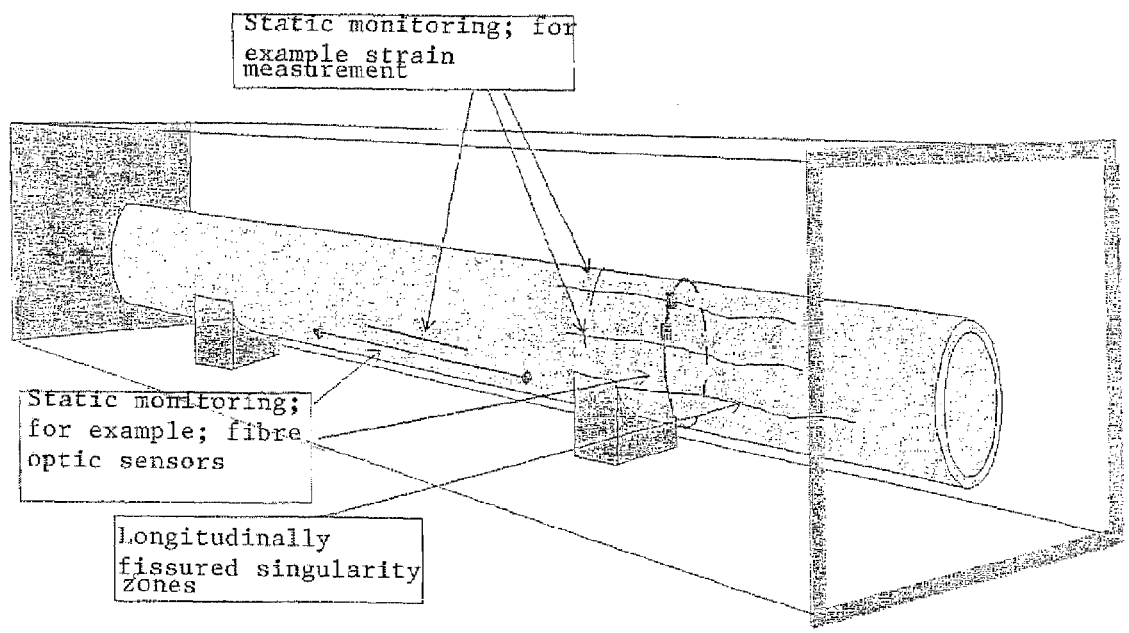
FIG. 2 is a schematic description of a static monitoring device.

The combination of the permanent monitoring techniques and the prediction tool constitutes the intelligent monitoring device (IMD) constituting the system according to the invention.

A pre-processing of the data produced by the permanent monitoring is necessary in order to retain only a limited amount of data (stiffness of the pipe $K(t_i)$ and its residual steel cross-section $A_s(t_i)$) synthesizing the measurements taken over a defined period.

The prediction tool is built around physical laws (modelling of the corrosion and mechanical performance of the pipe) allowing determination, by means of a calculation, of an estimator of the residual steel cross-section $A'_s(t_i)$ and its evolution over time $A'_s(t>t_i)$.

The residual steel cross-section obtained by the monitoring system $A_s(t_i)$ is then compared, at regular intervals, with its estimator $A'_s(t_i)$. If the difference between these two values is greater than a precision E fixed in advance, the value of the measured residual steel cross-section $A_s(t_i)$ is used to update the corrosion model. This updating process allows recalculation of the estimator of the residual steel cross-section $A'_s(t_i)$ and its evolution over time $A'_s(t>t_i)$. The prediction tool is designed so as to be able to integrate, in the phase of updating the corrosion model, information coming from a source other than the static or dynamic monitoring (laboratory tests, visual inspections, number of failures, etc.).

Once the desired precision is obtained, the value of the measured residual steel cross-section $A_s(t_i)$ is compared with a limit criterion for mechanical strength CL. If the measured value is less than the criterion, it can be decided, for example, to undertake an immediate replacement of the instrumented section of pipe.

If the measured value of the residual steel cross-section $A_s(t_i)$ is greater than the limit criterion, the residual service life of the pipe $D(t_i)$ is determined using the evolution of the residual steel cross-section calculated by the prediction tool.

The following stage consists of comparing the value of the measured residual steel cross-section $A_s(t_i)$ with an alarm criterion CA associated with the mechanical strength. This time, if the measured value is less than the alarm criterion, a reinforcement of the instrumented section of pipe can, for example, be installed so as to defer the replacement.

If the measured value of the residual steel cross-section $A_s(t_i)$ is greater than the alarm criterion, the operating time before the alarm $D_a(t_i)$ actuates is determined using the evolution of the residual steel cross-section calculated by the prediction tool. In these conditions, the maintenance operation would consist, for example, of doing nothing and the pipe would be left in that state.

A description will now be given, with reference to the figures mentioned above. A detailed description of an embodiment of the system according to the invention will now be given.

The static monitoring device is used in a limited number of singularity zones defined in advance. The objective of this device is to monitor, in singularity zones, the long term evolution of the longitudinal and circumferential deformations of the pipes.

For the purpose of making this static monitoring reliable, two types of sensors are to be provided. For example, a combination of standard strain measurement sensors (induction sensors) and fibre optic sensors measuring on bases of different lengths can be a possibility.

The longitudinal deformations serve mainly to verify the mechanical strength of the pipes (risk of bursting) in the event of accidental stresses (earthquakes, excess pressures). The circumferential deformations are used in normal operating conditions in the context of the solution allowing monitoring of the long term evolution of the residual steel cross-section, with reference to FIG. 3.

The dynamic monitoring device exploits the natural vibration of the pipes under pressure. It is designed to measure the displacement speeds at a defined number of points using seismometers. The objective of the dynamic monitoring device is to determine the vibration eigen modes of the pipe (modal deformation) and the associated frequencies.

The volume of raw data collected by the monitoring device increases according to the frequency of measurement. At regular intervals, it is necessary to undertake a pre-processing of this data in order to extract a limited number of values allowing the residual steel cross-section to be measured.

Figure 3:
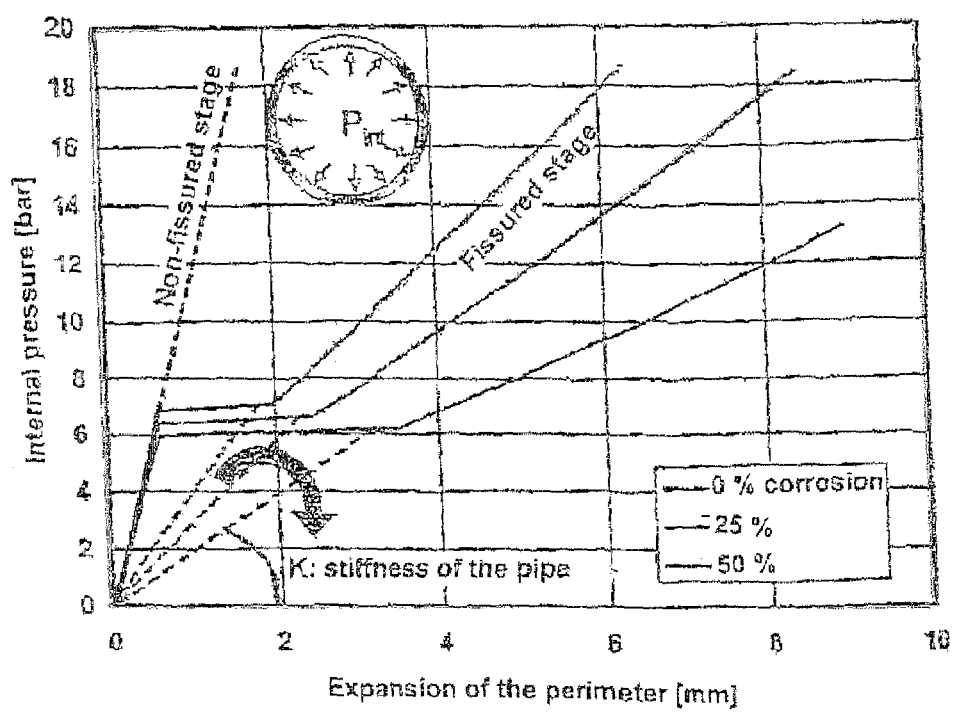
FIG. 3 illustrates the performance under pressure of a pipe for which the solution can be implemented (the case of a reinforced concrete pipe)
Figure 4:
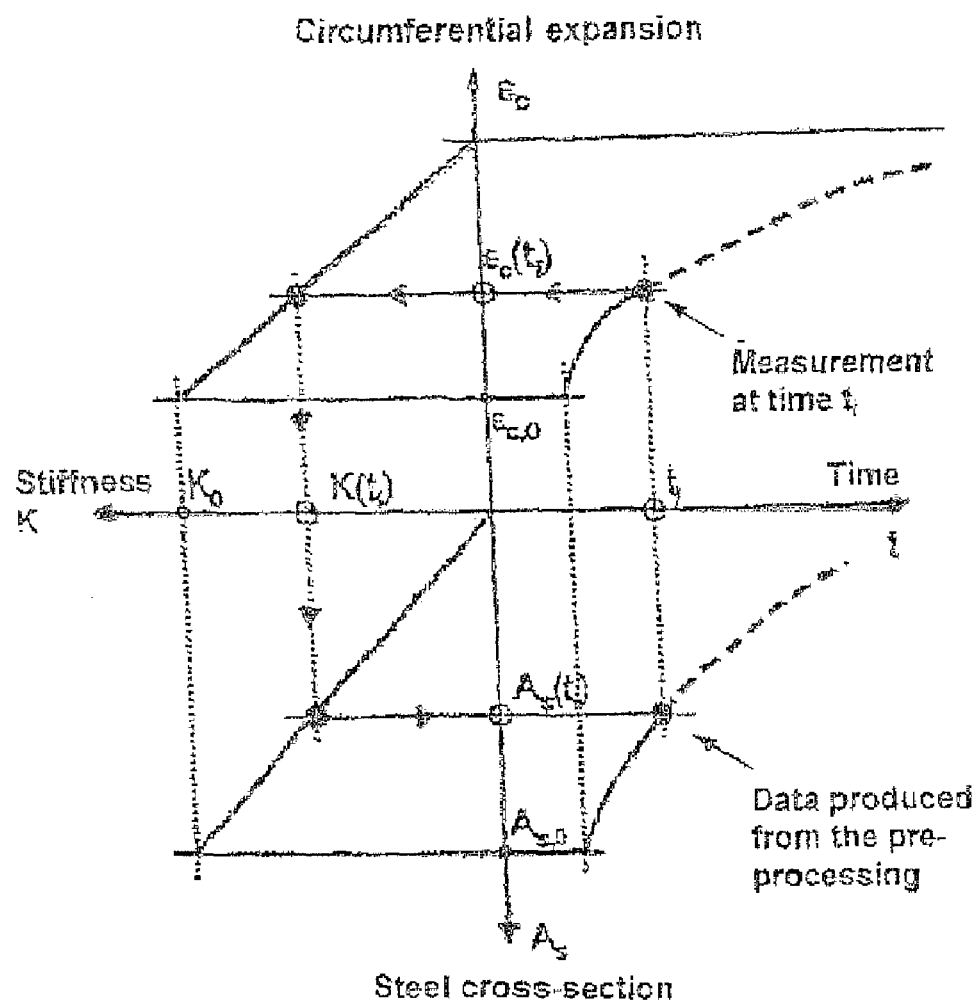
FIG. 4 illustrates the different stages of pre-processing of the basic data allowing the value of the residual steel cross-section to be reached (illustrated for the case of static monitoring)

This pre-processing consists of calculating, using raw data (deformations, pressure, eigen frequencies, modal deformations):

an average deformation over a given period (for example: before, during and after a pressurization cycle);
the average eigen frequencies in the operating phase;
the stiffness K of the section of pipe over a given period, with reference to FIGS. 3 and 4;
the corresponding residual steel cross-section $A_s$.

The diagram of FIG. 4 allows illustration of the different stages of pre-processing in the case of the static monitoring. The laws which define the relationships between the deformations and the stiffness and between the stiffness and the residual steel cross-section are intrinsic characteristics of the instrumented pipe.

A similar diagram to that of FIG. 4 is made for the dynamic monitoring. In this case, the laws used allow definition of the relationship between an eigen frequency, the loss of stiffness of the zone concerned (this depends on the associated vibration mode) and the residual steel cross-section. These laws are also intrinsic characteristics of the instrumented pipe and are greatly dependent on the surface conditions of the pipe.

The different stages of pre-processing of the basic data allow the value of the residual steel cross-section to be reached, as FIG. 4 illustrates for the case of the static monitoring.

The following stage consists of comparing, at regular intervals, the residual steel cross-section obtained by the monitoring system As(ti) with its estimator $A'_s(t_i)$. If the difference between these two values is greater than a precision fixed in advance, the measured value of the residual steel cross-section $A_s(t_i)$ is used to update the corrosion model.

This update is based, among other things, on a Bayesian logic which allows improvement of the precision of the predictive model when ground data are available.

The updating process allows recalculation of the estimator of the residual steel cross-section $A'_s(t_i)$ and its evolution over time $A'_s(t>t_i)$.

The prediction tool is designed so as to be able to integrate, in the phase of updating the corrosion model, information coming from a source other than the static or dynamic monitoring (laboratory tests, visual inspections, number of failures, etc.).

Once the desired precision is obtained, the measured value of the residual steel cross-section $A_s(t_i)$ is compared with a limit criterion for mechanical strength CL. If the measured value is less than the criterion, it can be decided, for example, to undertake an immediate replacement of the instrumented section of pipe.

The following stage consists in comparing the measured value of the residual steel cross-section $A_s(t_i)$ with an alarm criterion CA associated with the mechanical strength. This time, if the measured value is less than the alarm criterion, a reinforcement of the instrumented section of pipe can, for example, be installed so as to defer the replacement.

Figure 5:
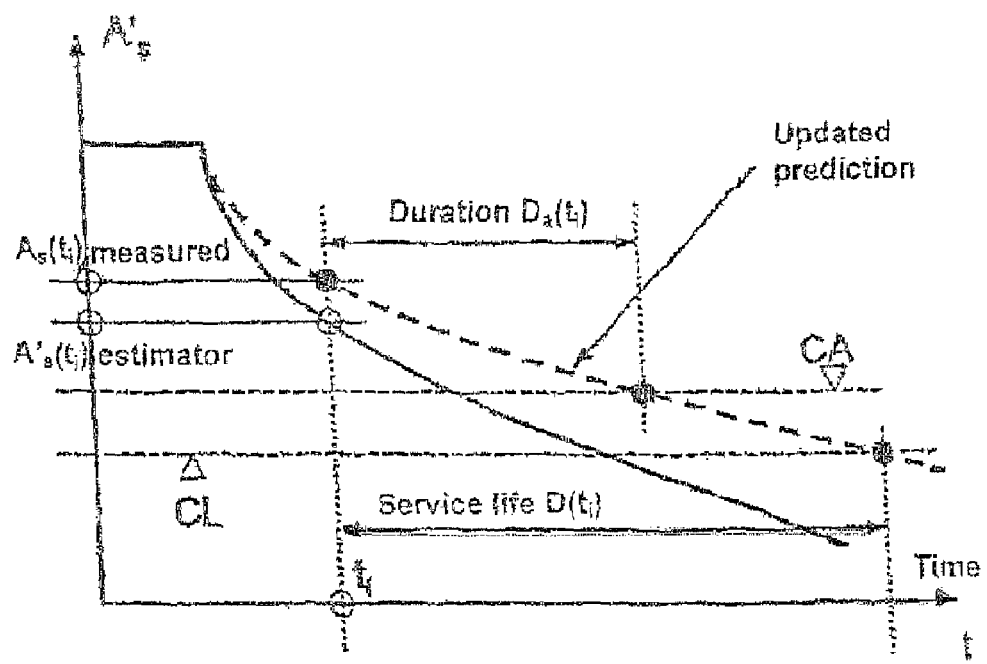
FIG. 5 illustrates an updating process used in the method according to the invention.

If the measured value of the residual steel cross-section $A_s(t_i)$ is greater than the limit criterion, the residual service life of the pipe is determined using the evolution of the residual steel cross-section calculated by the prediction tool in the following manner, with reference to FIG. 5:

$$D(t_i) = t(A_s = CL) - t_i$$

If the measured value of the residual steel cross-section $A_s(t_i)$ is greater than the alarm criterion, the operating time before the alarm $D_a(t_i)$ is determined using the evolution of the residual steel cross-section calculated by the prediction tool in the following manner:

$$D_a(t_i) = t(A_s = CA) - t_i$$

When the measured value of the residual steel cross-section $A_s(t_i)$ is greater than the alarm criterion, the maintenance operation would consist, for example, of not doing anything and the pipe would be left in that state.

Of course, the invention is not limited to the examples which have just been described and numerous variations can be applied to these examples without going beyond the scope of the invention.

The invention claimed is:

1. A method for monitoring the performance of a pipe containing a pressurized fluid, this pipe comprising at least one continuous run zone and singularity zones, comprising:
   a static monitoring of a predetermined number of singularity zones and/or continuous run zones, in order to provide circumferential expansion information,
   a calculation of an effective stiffness K(ti) of the pipe and a measured residual steel cross-section As(ti) of the pipe using said circumferential expansion information,
   predicting a temporal evolution A's(t>ti) of an estimator A's(ti) of the residual steel cross-section, this prediction being made on the basis of a model of corrosion and mechanical performance of the pipe, comparing between the measured residual steel cross-section As(ti) and the estimator A's(ti) of the residual steel cross-section, updating a corrosion model, when the difference between said measured residual steel cross-section As(ti) and said estimator of the residual steel cross-section A's(ti) is greater than a predetermined precision, a comparison of the measured value As(ti) of the residual steel cross-section with a limit criterion of mechanical strength (CL), this comparison being followed by:
  either a transmission of information for immediate replacement of a section of said pipe corresponding to the monitored zones, when this measured value As(ti) is less than said limit criterion for mechanical strength (CL),
  or a calculation of the remaining service life D(ti) of said pipe, and performing a maintenance operation on the pipe if said monitoring of the performance demonstrates the need for a maintenance operation.

2. The method according to claim 1, also comprising a dynamic monitoring of the pipe in order to provide information relating to the vibration eigen modes and frequencies of said pipe, and in that this information relating to eigen modes and frequencies is also used to calculate the stiffness K(ti) and the measured residual steel cross-section As(ti) of the pipe.

3. The method according to claim 2, also comprising:
a process of predicting a temporal evolution A's(t>ti) of an estimator A's(ti) of the residual steel cross-section, this prediction being made on the basis of a model of corrosion and mechanical performance of the pipe,
a comparison between the measured residual steel cross-section As(ti) and the estimator A's(ti) of the residual steel cross-section, and
an updating of a corrosion model, when the difference between said measured residual steel cross-section As(ti) and said estimator of the residual steel cross-section A's(ti) is greater than a predetermined precision.

4. The method according to claim 1, wherein the prediction process is organized so as to integrate, in a phase of updating the corrosion model, information coming from an external source.

5. The method according to claim 1, wherein the method also comprises a comparison of the measured value As(ti) of the residual steel cross-section with an alarm criterion (CA) associated with the mechanical strength of said pipe, this comparison being followed by:
  either a transmission of information for reinforcement and subsequent replacement of a section of said pipe corresponding to the monitored zones, when this measured value As(ti) is less than said alarm criterion (CA),
  or a calculation of operating time before the alarm Da(ti) of said pipe actuates.

6. A system for monitoring the performance of a pipe containing a pressurized fluid, this pipe comprising at least one continuous run zone and singularity zones, comprising:
  a device for static monitoring of a predetermined number of singularity zones and/or continuous run zones in order to provide circumferential expansion information,
  a calculator configured for calculating an effective stiffness K(ti) of the pipe and a measured residual steel cross-section As(ti) of the pipe using said circumferential expansion information,
  a display configured for displaying the results of said monitoring,
  a predictor configured for predicting a temporal evolution A's(t>ti) of an estimator A's(ti) of the residual steel cross-section, this prediction being made on the basis of a model of corrosion and mechanical performance of the pipe,
  a comparator configured for comparing the measured residual steel cross-section As(ti) and the estimator A's(ti) of the residual steel cross-section,
  an updater configured for updating a corrosion model, when the difference between said measured residual steel cross-section As(ti) and said estimator of the residual steel cross-section A's (ti) is greater than a predetermined precision, and
  a value comparator configured for comparing the measured value As(ti) of the residual steel cross-section with a limit criterion of mechanical strength (CL), this comparison being followed by:
    either a transmission of information for immediate replacement of a section of said pipe corresponding to the monitored zones, when this measured value As(ti) is less than said limit criterion for mechanical strength (CL),
    or a calculation of the remaining service life D(ti) of said pipe.

7. The system according to claim 6, also comprising a dynamic monitoring device for dynamic monitoring of the pipe in order to provide information on eigen vibration modes and frequencies of said pipe, this information on eigen modes and frequencies being used by the calculator configured for calculation of an effective stiffness K(ti) and of a measured residual steel cross-section As(ti).

8. The system according to claim 6, wherein the static monitoring device comprises a longitudinal measuring apparatus configured for measuring longitudinal deformations of a section of the pipe and a circumferential measuring device configured for measuring circumferential deformations of said section.

9. The system according to claim 6, wherein the dynamic monitoring device comprises a seismometer for measuring displacement speeds at a predetermined number of points on the pipe.

10. The system according to claim 6, also comprising a pre-processing calculator configured for pre-processing raw data provided by the static and/or dynamic monitoring device, the preprocessing calculator being designed to calculate an average deformation over a given period and average eigen frequencies in the operating phase.

11. A system for monitoring the performance of a pipe containing a pressurized fluid, this pipe comprising at least one continuous run zone and singularity zones, comprising:
  a device for static monitoring of a predetermined number of singularity zones and/or continuous run zones in order to provide circumferential expansion information;
  a device for calculating an effective stiffness K(ti) of the pipe and a measured residual steel cross-section As(ti) of the pipe using said circumferential expansion information;
  a device for displaying the results of said monitoring;
  a device for predicting a temporal evolution A's(t>ti) of an estimator A's(ti) of the residual steel cross-section, this prediction being made on the basis of a model of corrosion and mechanical performance of the pipe;
  a device for comparing the measured residual steel cross-section As(ti) and the estimator A's(ti) of the residual steel cross-section;
  a device for updating a corrosion model, when the difference between said measured residual steel cross-section As(ti) and said estimator of the residual steel cross-section A's (ti) is greater than a predetermined precision; and a device for comparing the measured value As(ti) of the residual steel cross-section with a limit criterion of mechanical strength (CL), this comparing being followed by:
  either a transmission of information for immediate replacement of a section of said pipe corresponding to the monitored zones, when this measured value As(ti) is less than said limit criterion for mechanical strength (CL),
  or a calculation of the remaining service life D(ti) of said pipe.

12. The system according to claim 11, also comprising a device for dynamic monitoring of the pipe in order to provide information on eigen vibration modes and frequencies of said pipe, this information on eigen modes and frequencies being used by the device for calculating the effective stiffness K(ti) and the measured residual steel cross-section As(ti).

13. The system according to claim 11, wherein the static monitoring device comprises a device for measuring longitudinal deformations of a section of the pipe and a device for measuring circumferential deformations of said section.

14. The system according to claim 11, wherein the dynamic monitoring device comprises a seismometer for measuring displacement speeds at a predetermined number of points on the pipe.

15. The system according to claim 11, also comprising a device for preprocessing raw data provided by the static and/or dynamic monitoring device, this pre-processing device being designed to calculate an average deformation over a given period and average eigen frequencies in the operating phase.

16. The system according to claim 11, also comprising:
  a device for predicting a temporal evolution A's(t>ti) of an estimator A's(ti) of the residual steel cross-section, this prediction being made on the basis of a model of corrosion and mechanical performance of the pipe,
  a device for comparing the measured residual steel cross-section As(ti) and the estimator A's(ti) of the residual steel cross-section, and
  a device for updating a corrosion model, when the difference between said measured residual steel cross-section As(ti) and said estimator of the residual steel cross-section A's (ti) is greater than a predetermined precision.

* * * * *